United States Patent
Jacoby

(10) Patent No.: US 8,610,732 B2
(45) Date of Patent: Dec. 17, 2013

(54) SYSTEM AND METHOD FOR VIDEO MEMORY USAGE FOR GENERAL SYSTEM APPLICATION

(75) Inventor: Rambod Jacoby, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 938 days.

(21) Appl. No.: 12/333,108

(22) Filed: Dec. 11, 2008

(65) Prior Publication Data

US 2010/0149199 A1    Jun. 17, 2010

(51) Int. Cl.
G06F 12/02    (2006.01)
G06F 15/167    (2006.01)

(52) U.S. Cl.
USPC .......................................... 345/543; 345/541

(58) Field of Classification Search
USPC .................. 345/501, 503, 541, 542, 543, 568
See application file for complete search history.

(56) References Cited

U.S. PATENT DOCUMENTS

| | | |
|---|---|---|
| 4,000,487 A | 12/1976 | Patterson et al. |
| 4,100,601 A | 7/1978 | Kaufman et al. |
| 4,553,224 A | 11/1985 | Struger et al. |
| 4,628,446 A | 12/1986 | Hoffner, II |
| 4,791,403 A | 12/1988 | Mitchell et al. |
| 4,803,477 A | 2/1989 | Miyatake et al. |
| 5,109,417 A | 4/1992 | Fielder et al. |
| 5,227,789 A | 7/1993 | Barry et al. |
| 5,293,489 A | 3/1994 | Furui et al. |
| 5,347,637 A | 9/1994 | Halford |
| 5,495,542 A | 2/1996 | Shimomura et al. |
| 5,508,909 A | 4/1996 | Maxwell et al. |
| 5,644,524 A | 7/1997 | Van Aken et al. |
| 5,736,987 A | 4/1998 | Drucker et al. |
| 5,793,371 A | 8/1998 | Deering |
| 5,801,708 A | 9/1998 | Alcorn et al. |
| 5,801,975 A | 9/1998 | Thayer et al. |
| 5,819,058 A | 10/1998 | Miller et al. |
| 5,831,640 A | 11/1998 | Wang et al. |
| 5,835,097 A | 11/1998 | Vaswani et al. |
| 5,841,442 A | 11/1998 | Einkauf et al. |
| 5,854,638 A * | 12/1998 | Tung .............................. 345/542 |
| 5,963,744 A | 10/1999 | Slavenburg et al. |
| 6,052,127 A | 4/2000 | Vaswani et al. |
| 6,055,000 A | 4/2000 | Okada |
| 6,078,334 A | 6/2000 | Hanaoka et al. |
| 6,130,680 A | 10/2000 | Cox et al. |

(Continued)

OTHER PUBLICATIONS

Mark Adler, Gzappend, Nov. 4 2003, http://svn.ghostscript.com/ghostscript/tags/zlib—1.2.3/examples/gzappend.—com.

(Continued)

*Primary Examiner* — Jacinta M Crawford

(57) ABSTRACT

A system and method for facilitating access to graphics memory wherein the graphics memory can be shared between a graphics processor and general system application. The method includes detecting an idle state of a graphics processing unit (GPU). The GPU uses graphics memory operable for storing graphics data. The method further includes determining an amount of available memory of the graphics memory of the GPU and signaling an operating system regarding the available memory. Memory data transfers are then received to store data into the available memory of the graphics memory wherein the data is related to general system application. Memory accesses to the available memory of the GPU are translated into a suitable format and executed so that the graphics memory is shared between the GPU and the operating system.

19 Claims, 4 Drawing Sheets

(56) References Cited

U.S. PATENT DOCUMENTS

| | | |
|---|---|---|
| 6,184,893 B1 | 2/2001 | Devic et al. |
| 6,233,641 B1 | 5/2001 | Graham et al. |
| 6,295,594 B1 | 9/2001 | Meier |
| 6,304,268 B1 | 10/2001 | Iourcha et al. |
| 6,381,664 B1 | 4/2002 | Nishtala et al. |
| 6,433,789 B1 | 8/2002 | Rosman |
| 6,499,077 B1 | 12/2002 | Abramson et al. |
| 6,501,851 B1 | 12/2002 | Kondo et al. |
| 6,546,409 B1 | 4/2003 | Wong |
| 6,553,446 B1 | 4/2003 | Miller |
| 6,580,828 B1 | 6/2003 | Li |
| 6,658,559 B1 | 12/2003 | Arora et al. |
| 6,678,784 B2 | 1/2004 | Marmash |
| 6,715,023 B1 | 3/2004 | Abu-Lebdeh et al. |
| 6,721,813 B2 | 4/2004 | Owen et al. |
| 6,732,210 B1 | 5/2004 | Mathieson |
| 6,825,848 B1 | 11/2004 | Fu et al. |
| 6,847,365 B1 | 1/2005 | Miller et al. |
| 6,876,362 B1 | 4/2005 | Newhall, Jr. et al. |
| 7,023,445 B1 | 4/2006 | Sell |
| 7,050,063 B1 | 5/2006 | Mantor et al. |
| 7,106,339 B1 * | 9/2006 | Grindstaff et al. ............ 345/543 |
| 7,109,999 B1 | 9/2006 | Lindholm et al. |
| 7,126,604 B1 | 10/2006 | Purcell et al. |
| 7,221,369 B1 * | 5/2007 | Tripathi et al. ............... 345/532 |
| 7,224,838 B2 | 5/2007 | Kondo et al. |
| 7,290,080 B2 | 10/2007 | Patel |
| 7,332,929 B1 | 2/2008 | Normoyle et al. |
| 7,380,092 B2 | 5/2008 | Perego et al. |
| 7,487,327 B1 | 2/2009 | Chang et al. |
| 7,624,222 B2 | 11/2009 | Nanda et al. |
| 7,752,413 B2 | 7/2010 | Hoover et al. |
| 7,928,988 B1 | 4/2011 | Levas |
| 8,082,381 B2 | 12/2011 | Reddy et al. |
| 8,103,803 B2 | 1/2012 | Reddy et al. |
| 2001/0011326 A1 | 8/2001 | Yoshikawa et al. |
| 2002/0004860 A1 | 1/2002 | Roman |
| 2002/0147753 A1 | 10/2002 | Rao et al. |
| 2002/0156943 A1 | 10/2002 | Ishimura et al. |
| 2003/0013477 A1 | 1/2003 | McAlinden |
| 2003/0016229 A1 | 1/2003 | Dorbie et al. |
| 2003/0023646 A1 | 1/2003 | Lin et al. |
| 2003/0105788 A1 | 6/2003 | Chatterjee |
| 2003/0131164 A1 | 7/2003 | Abramson et al. |
| 2003/0169265 A1 | 9/2003 | Emberling |
| 2003/0206177 A1 | 11/2003 | Hoppe et al. |
| 2003/0223490 A1 | 12/2003 | Kondo et al. |
| 2004/0015659 A1 | 1/2004 | Dawson |
| 2004/0027358 A1 | 2/2004 | Nakao |
| 2004/0151372 A1 | 8/2004 | Reshetov et al. |
| 2004/0207631 A1 | 10/2004 | Fenney et al. |
| 2005/0024376 A1 | 2/2005 | Gettman et al. |
| 2005/0110790 A1 | 5/2005 | D'Amora |
| 2005/0193169 A1 | 9/2005 | Ahluwalia |
| 2006/0059289 A1 | 3/2006 | Ng et al. |
| 2007/0206018 A1 * | 9/2007 | Bajic et al. .................... 345/501 |
| 2008/0244156 A1 | 10/2008 | Patel |
| 2008/0245878 A1 | 10/2008 | Shiota et al. |
| 2008/0282102 A1 | 11/2008 | Reddy et al. |
| 2008/0288550 A1 | 11/2008 | Wang et al. |
| 2010/0057974 A1 | 3/2010 | Reddy et al. |
| 2010/0153618 A1 | 6/2010 | Mathieson et al. |

OTHER PUBLICATIONS

Xilinx; "Using Dedicated Multiplexers in Spartan-3 Generation FPGAs"; Application Note; May 20, 2005.

Bluethgen. Hans-Martin; "BEE Mux-Demux Implementation for Connecting Subsystems on 2 FPGAs"; Jul. 15, 2002.

Micro Computer Control; "IP-201 12C Bus Multiplexer Board, User's Guide; Revision 1"; Jun. 2000.

Stok, L; Interconnect Optimization During Data Path Allocation; IEEE 1990.

Erdahl, Mike; "an Open Architecture for Multiplexing and Processing Telemetry Data"; Veda Systems Incorporated; Jul. 15, 1997.

Digital Equipment Corporation; "DH11 Asynchronous 16-line Multiplexer Mainteinence Manual"; Apr. 1975.

Campbell Scientific, Inc.; "AM16/32B Relay Multiplexer, Instruction Manual"; Oct. 2009.

Jiang et al.; "A Multiplexer Controlled by Fuzzy Associate Memory Leaky Bucket in ATM Networks"; 1997 IEEE International Symposium on Circuits and systems; IEEE, Jun. 12, 1997.

* cited by examiner

SYSTEM AND METHOD FOR VIDEO MEMORY USAGE FOR GENERAL SYSTEM APPLICATION

FIELD OF THE INVENTION

Embodiments of the present invention are generally related to computer systems employing graphics processing units (GPUs).

BACKGROUND OF THE INVENTION

As computer systems have advanced, the demand for system memory for execution of applications has increased rapidly. The amount of system memory in a computing device can have a significant impact on the performance of the computer system as well as the user experience.

Similarly, graphics processing units (GPUs) have become increasingly advanced. Correspondingly, the memory used by GPUs has increased to satisfy the demands of increasingly advanced GPUs. The memory is used for storing calculations and data necessary to generate an image (e.g., the frame buffer). Unfortunately, when a GPU is in an idle state, such as executing non graphics intensive applications such as spreadsheets, word processing, and email programs, etc., a vast portion of its memory remains unused. Thus, a majority of the memory remains unused until graphics intensive applications (e.g., games or applications involving graphics rendering) are launched, if ever. Among other things, this unused memory consumes power which is thus wasted during a GPU idle state.

SUMMARY OF THE INVENTION

Accordingly, what is needed is a system capable of utilizing graphics memory that would otherwise not be used for graphics processing. Embodiments of the present invention provide a system for accessing graphics memory as part of a computer system memory pool so that the memory can be used for general system application. Embodiments of the present invention allow for increased power efficiency by making use of graphics memory for general system use that would otherwise consume power while being unused.

In one embodiment, the present invention is implemented as a method for enabling access to graphics memory for general system use. The method includes detecting an idle state (e.g., low performance graphics mode) of a graphics processing unit (GPU). The GPU comprises memory (e.g., frame buffer) operable for storing graphics data. The method further includes determining an amount of available memory of the memory of the GPU and signaling an operating system. Memory data transfers (e.g., from virtual memory) are then received to store data into the graphics memory for general system application. Memory accesses to the memory of the GPU are translated into a suitable format and executed. When at some point a graphics intensive application is started by the user and the GPU needs the entire amount of its memory for graphics processing, the GPU can pass the application data stored via a bus where it is redirected to the system's hard drive.

In another embodiment, the present invention is implemented as a system for facilitating access to graphics memory for general system application. The system includes a performance mode monitor for determining a performance mode of a graphics processing unit (GPU) including graphics memory (e.g., frame buffer) and a memory available module for determining an amount of the graphics memory available (e.g., for use as part of a system memory pool). The system further includes a resource signaling module for signaling that the graphics memory is available and an interpretation module for interpreting memory access requests. The interpreting of memory access requests may include converting the requests from a system memory format to a format compatible with a memory access request of graphics memory.

In this manner, embodiments of the present invention facilitate increased system performance by adding graphics memory to the general system memory pool of a computing system. In one embodiment, graphics memory provides a much quicker alternative for data storage over virtual memory which requires disk accesses. Embodiments increase the value of a GPU card by increasing system memory and therefore make the increasingly advanced graphics card more desirable even during periods of non-intensive graphics. Embodiments further increase energy efficiency (e.g., of a mobile GPU) by making use of graphics memory that would otherwise not be used.

In another embodiment, the present invention is implemented as a graphics processing unit (GPU) subsystem. The GPU subsystem includes a graphics processor for executing graphics instructions and a frame buffer comprising memory for storing data used for execution of the graphics instructions. The GPU subsystem further includes a signaling module for signaling (e.g., a chipset, operating system, or the like) that a portion of the frame buffer is available for use by a computer system. A frame buffer access module is also available for facilitating access to the frame buffer memory by the computer system. The frame buffer may be accessible via a PCI Express bus in one instance.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
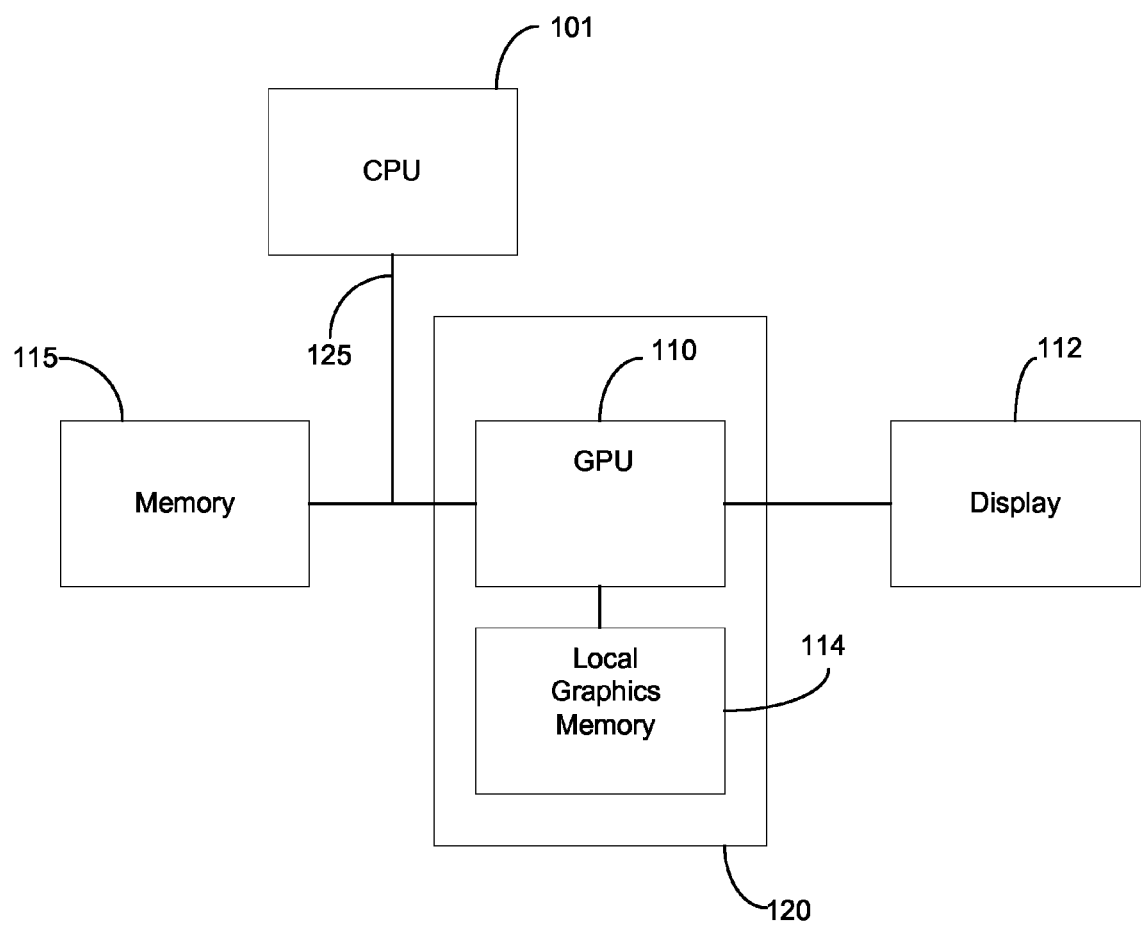
FIG. 1 shows an exemplary computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components in accordance with embodiments of the present invention providing the execution platform for certain hardware-based and software-based functionality. In general, computer system 100 comprises at least one central processing unit (CPU) 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU subsystem 120 may be coupled to a display 112. One or more additional GPUs can optionally be coupled to system 100 to further increase its computational power. The GPU(s) 110 is coupled to the CPU 101 and the system memory 115 via a communication bus 125. The GPU 120 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 is coupled with the GPU 110 for high bandwidth graphics data storage, e.g., the frame buffer.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Embodiments of the present invention facilitate increased system performance by adding graphics memory to the general system memory pool of a computing system. In one embodiment, graphics memory provides a much quicker alternative for data storage over virtual memory which requires disk accesses. Embodiments increase the value of a GPU card by increasing system memory and therefore make the increasingly advanced graphics card more desirable even during periods of non-intensive graphics. Embodiments further increase energy efficiency (e.g., of a mobile GPU) by making use of graphics memory that would otherwise not be used.

Figure 2:
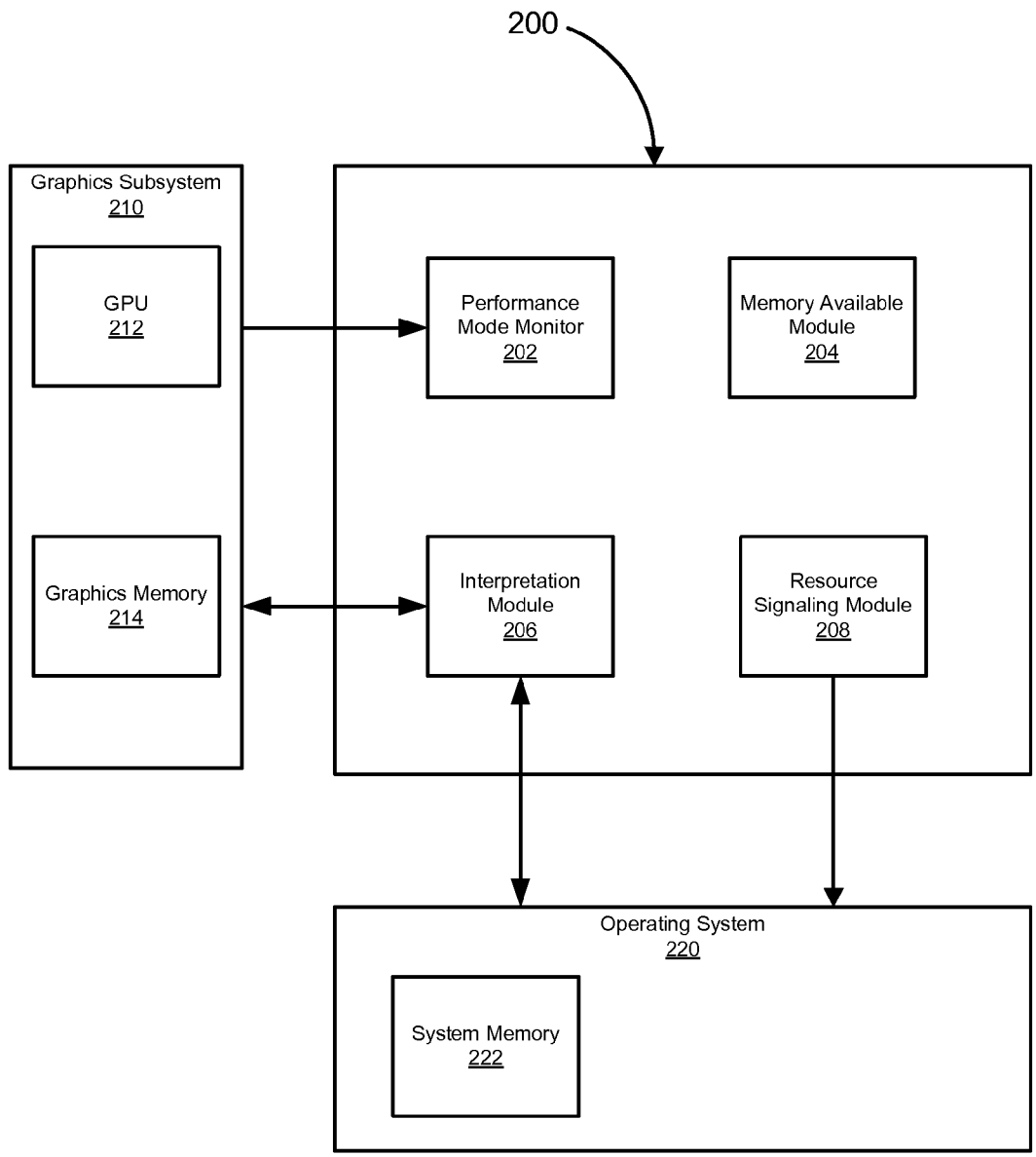
FIG. 2 shows a block diagram of an exemplary system in accordance with one embodiment of the present invention.

FIG. 2 illustrates example components used by various embodiments of the present invention. Although specific components are disclosed in system 200, it should be appreciated that such components are examples. That is, embodiments of the present invention are well suited to having various other components or variations of the components recited in system 200. It is appreciated that the components in system 200 may operate with other components than those presented, and that not all of the components of system 200 may be required to achieve the goals of system 200.

FIG. 2 shows a block diagram of an exemplary system in accordance with one embodiment of the present invention for implementing graphics memory sharing. System 200 includes performance mode monitor 202, memory available module 204, interpretation module 206, and resource signaling module 208. System 200 may be implemented in software. It is appreciated that system 200 may be part of, included in, or executed by a graphics processing unit (GPU) subsystem. System 200 facilitates temporary access to graphics memory (e.g., GDDR (Graphics Double Data Rate memory)) of a GPU by a computer system when that memory is not otherwise being used by the GPU. In one embodiment, system 200 is operable to facilitate access to graphics memory of multiple GPUs, e.g., in an SLI (scalable link interface) or Crossfire configuration. System 200 may further be operable to facilitate access to graphics memory of multi-core GPUs. System 200 is operable to communicate with graphics subsystem 210 and operating system (OS) 220. OS 200 may thus access a memory pool including system memory 222 and a portion of graphics memory 214.

Performance mode monitor 202 determines a performance mode of the graphics processing unit (GPU) 212 to determine graphics memory usage. In one embodiment, performance mode monitor 202 receives a signal including the performance mode of GPU 212. The GPU subsystem 210 includes graphics memory 214 (e.g., frame buffer) operable to be used in performing graphics processing (e.g., rendering). In one embodiment, GPU 212 has a low or first performance mode corresponding to a low intensity graphics application execution, which utilizes a small portion of graphics memory (e.g., less than 100 MB or less than 64 MB) and a high or second performance mode corresponding to high intensity graphics application execution (e.g., video games, graphical simulations, and the like), which utilizes a relatively large portion of graphics memory (e.g., 256 MB, 512 MB, or 1 GB, etc.). Performance mode monitor 202 may thus monitor and report whether GPU 212 is high performance mode or a low performance mode or any performance mode there between.

Memory available module 204 determines an amount of graphics memory available for use outside the graphics processor. More specifically, memory available module 204 determines the graphics memory space that is available during each performance mode of a GPU. For example, when GPU 212 is in a low performance mode, memory available module 204 determines the graphics memory space which is not being used for graphics processing and therefore may be available for general system use. In one embodiment, the amount of graphics memory that can be made available may be a configurable option (e.g., user configurable). For example, a graphics driver or other application may allow a user to select a portion of graphics memory 214 to be dedicated for use by a computing system for general application use.

Interpretation module 206 interprets memory access requests. More specifically, interpretation module 206 interprets memory access requests (e.g., reads and writes) from a computer system and interprets them for accessing graphics memory 214. For example, interpretation module 206 may carry out an algorithm for receiving a memory access request (e.g., from OS 220) in a system DDR format and convert the request to a GDDR format for carrying out with the allocated graphics memory. By using allocated graphics memory, rather than virtual memory, for general system applications, the overall efficiency of the computer increases as fewer disk accesses are required. In one embodiment, graphics memory 214 of the GPU subsystem 210 is used to store data that was stored in virtual memory (e.g., on a hard disk drive) and interpretation module 206 may reroute virtual memory calls to graphics memory for processing.

In one embodiment, the memory access requests may be received via a PCI Express bus which facilitates efficient use of graphics memory 214. The memory access requests allow graphics memory 214 to store application data. The storage of application data in graphics memory 214 effectively increasing overall memory available to a computer system.

Resource signaling module 208 signals that a portion of graphics memory 214 is available (e.g., when a GPU is in a low performance mode). In one embodiment, resource signaling module 208 signals a chipset (e.g., memory controller or Northbridge) that graphics memory is available and therefore, the overall level of system memory has increased. Resource signaling module 208 may also signal OS 220 that the graphics memory is available for storing application data.

Resource signaling module 208 may further signal that graphics memory is no longer available (e.g., signal OS 220). For example, when a graphics intensive application is started, the GPU may attempt to use a significant portion of graphics memory for graphics processing operations. In theses instances, the GPU (or some other device) passes the application data stored in the graphics memory (e.g., frame buffer) back to the motherboard though the PCI express bus where the data is redirected to virtual memory (e.g., hard disk drive) of the computer system.

Figure 3:
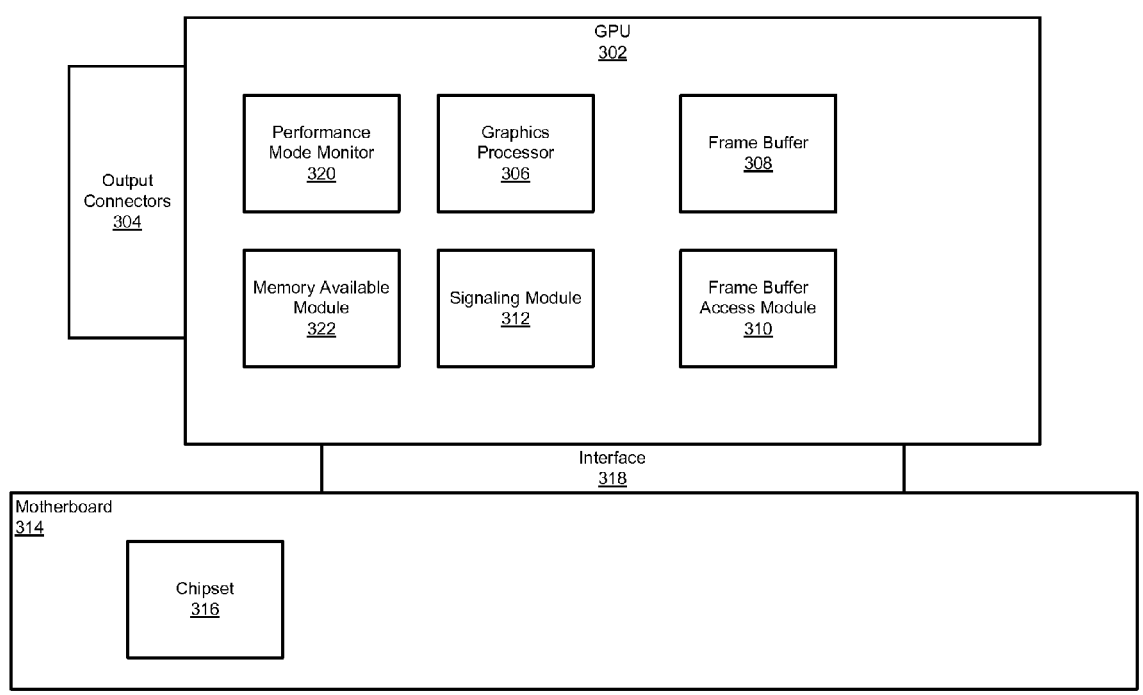
FIG. 3 shows a block diagram of an exemplary graphics processing unit (GPU) subsystem in accordance with one embodiment of the present invention.

FIG. 3 shows a block diagram of an exemplary graphics processing unit (GPU) subsystem connected to a motherboard in accordance with one embodiment of the present invention. A graphics processing unit (GPU) subsystem 302 includes graphics processor 306, frame buffer 308, signaling module 312, and frame buffer access module 310. GPU subsystem 302 further includes output connectors 304 and interface 318. GPU subsystem 302 may further include optional performance mode monitor 320 and optional memory available module 322. Output connections 304 allows GPU subsystem 302 to output graphics display signal (e.g., via Digital Visual Interface (DVI), High-Definition Multimedia Interface (HDMI), Displayport, and the like) for rending on a display screen.

Frame buffer 308 comprises memory for storing data used for execution of the graphics instructions. Frame buffer 308 may include one or more memory modules (e.g., one or more memory chips). Frame buffer 308 may further be a variety of types of memory including, but not limited to, GDDR2, GDDR3, GDDR4 or GDDR5. In one embodiment, frame buffer 308 is accessible via a PCI Express bus (e.g., interface 318).

Graphics processor 310 executes graphics instructions (e.g., for graphics rendering). Graphics processor 310 may further coordinate with signaling module 312 and frame buffer access module 310 to allow chipset 316 to access portions of frame buffer 308 thereby utilizing frame buffer 308 as part of system memory. It is appreciated that graphics processor 310 and chipset 316 may be designed to facilitate portions of frame buffer 308 being available for chipset 316 to utilize as system memory. Embodiments thus allow chipset 316 to access system DDR (double data rate) memory and GDDR memory as a memory pool. In one embodiment, graphics processor 310 transfers application data stored in frame buffer 308 to virtual memory before entering a high performance graphics mode in which all graphics memory would be needed for the GPU.

Frame buffer access module 310 facilitates a computer system to access frame buffer 308 for general system use. Frame buffer access module 310 converts or interprets memory access requests received from chipset 316 or motherboard 314 to a format compatible to the memory of frame buffer 308. In one embodiment, frame buffer access module 310 is operable to handle requests for data that were previously stored in virtual memory.

Signaling module 312 signals that a portion of frame buffer 308 is available for use by a computer system (e.g., via chipset 316). In one embodiment, signaling module 312 is operable to signal a memory controller of chipset 316 that a portion of frame buffer 308 is available (e.g., for use as part of a system memory pool). In another embodiment, a operating system may be signaled.

Interface 318 facilitates communication with motherboard 314, chipset 316, and other portions of a computer system. In one embodiment, interface 318 is a PCI Express interface or bus. It is appreciated that interface 318 may be any high speed interface operable to couple GPU subsystem 302 to a computer system. By using the high speed bus of interface 318, motherboard 314 may access the large amounts of frame buffer memory available in frame buffer 308 on GPU subsystem 302 for general system use when the GPU subsystem 302 is in an idle or low performance graphics mode.

Performance mode monitor 320 may be implemented in hardware and operate in a substantially similar manner to performance mode monitor 202. Memory available module 322 may be implemented in hardware and operate in a substantially similar manner to memory available module 204.

Figure 4:
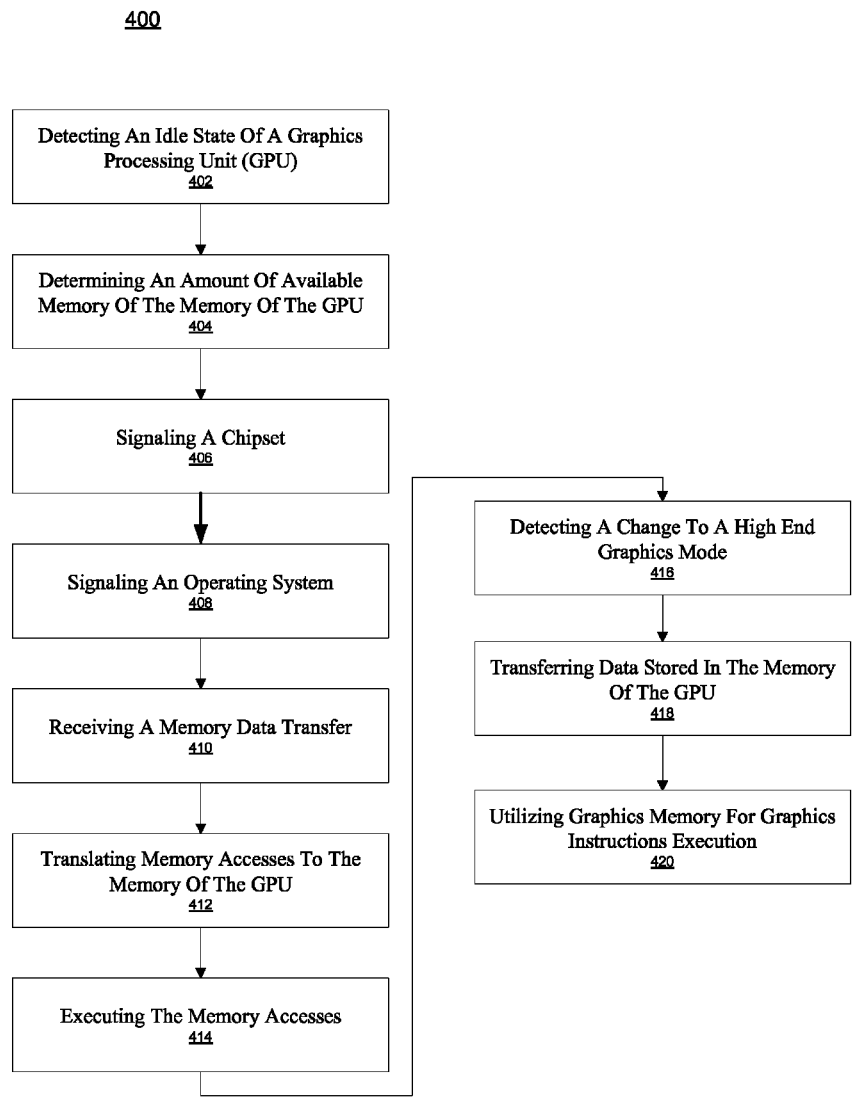
FIG. 4 shows a flowchart of an exemplary computer controlled process for enabling access to graphics memory in accordance with one embodiment of the present invention.

With reference to FIG. 4, flowchart 400 illustrates example functions used by various embodiments of the present invention. Although specific function blocks ("blocks") are disclosed in flowchart 400, such steps are examples. That is, embodiments are well suited to performing various other blocks or variations of the blocks recited in flowchart 400. It is appreciated that the blocks in flowchart 400 may be performed in an order different than presented, and that not all of the blocks in flowchart 400 may be performed.

FIG. 4 shows a flowchart of a computer controlled process for enabling access to graphics memory for general system applications in accordance with one embodiment of the present invention. The process of flowchart 400 may be used in conjunction with GPUs, mobile GPUs, chipsets, and operating systems. The process of flowchart 400 increases the power efficiency for a variety of devices including, but not limited to, portable devices (e.g., laptops, notebooks, cell phones) and computing system (e.g., desktop computers, servers, and the like) by making use of graphics memory that would otherwise remain powered but be unused during periods of low graphics processing.

In block 402, an idle state of a graphics processing unit (GPU) is detected. As described, the idle state may be a low performance graphics mode where substantial portions of graphics memory are unused.

In block 404, an amount of available graphics memory of the GPU is determined in real-time. In one embodiment, the amount of available graphics memory may be configurable or predetermined via a graphical user interface (GUI). For example, a computer system may be configured such that a certain amount of graphics memory is dedicated to the computer system even if the computer system is running a graphics intensive application. It is appreciated that the GPU and operating system can toggle the amount of memory used.

In block 406, a chipset is signaled. More specifically, the chipset may be signaled with the amount of available graphics memory that can be allocated for general system use. In one embodiment, the chipset includes a memory controller and reports to the operating system the amount of available memory (e.g., the combined memory pool of graphics memory and system memory).

In block 408, an operating system is signaled to indicate that graphics memory is available for application data and also the size of the graphics memory available for application data is included. In one embodiment, the operating system is signaled via a GPU driver. In another embodiment, the operating system is signaled via a chipset driver. Any of a number of well known methods can be used.

In block 410, a memory data transfer is received. The memory data transfer may be from a virtual memory storage (e.g., hard drive) or system memory to the graphics memory. It is appreciated that the memory data transfer may be modified for storage in graphics memory.

In block 412, memory accesses for the data stored in the memory of the GPU are translated to graphics memory. As described herein, the memory accesses are translated from OS memory calls or chipset memory accesses to a format suitable for accessing graphics memory. Where the graphics memory is being used for to store date previously stored on virtual memory, cache calls to a hard drive may be rerouted to graphics memory.

In block 414, the memory accesses are executed. The application data stored in graphics memory is accessed (e.g., read/write/erase) and results are returned (e.g., via an PCI Express bus).

In block 416, a change to a high end graphics mode is detected. As described herein, the launch of a graphics intensive application may cause a GPU to switch to a high end or high performance graphics mode and therefore need to use substantial portions of graphics memory, which may be temporarily used for general purpose use.

In block 418, data stored in the graphics memory of the GPU is transferred. As described herein, the portions of the data stored in the memory of the GPU may be transferred to a virtual memory storage (e.g., hard disk drive) or to system memory thereby making the memory of the graphics card again available for use in graphics instruction execution. In block 420, graphics memory is utilized for graphics instruction execution.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method for sharing graphics memory, comprising:
    detecting an idle state of a graphics processing unit (GPU) of a graphics subsystem, wherein said graphics subsystem comprises said graphics memory which is operable for storing graphics data;
    determining an amount of available memory of said graphics memory of said GPU, wherein said determining said amount of available memory is determined by said GPU;
    signaling an operating system about said available memory of said graphics memory;
    receiving a memory data transfer;
    translating memory accesses of said memory transfer to said available memory of said GPU; and
    executing said memory accesses, wherein said graphics memory is shared between said GPU and said operating system.

2. A method as described in claim 1 further comprising:
    detecting a change of said GPU to a high end graphics mode;
    transferring data stored in said available memory of said GPU;
    utilizing said available memory for graphics instruction execution.

3. A method as described in claim 1 wherein said signaling said operating system is performed via a GPU driver.

4. A method as described in claim 1 wherein said signaling said operating system is performed via a chipset driver.

5. A method as described in claim 1 wherein said signaling said operating system comprises an indication of a memory space of said available memory including an amount of said available memory.

6. A method as described in claim 1 wherein said GPU subsystem is part of a mobile device.

7. A method as described in claim 1 wherein said memory data transfer originates from a virtual memory source.

8. A method as described in claim 1 wherein said memory accesses comprise virtual memory requests.

9. A method as described in claim 1 further comprising configuring wherein said amount of available memory of said GPU via inputs from a graphical user interface (GUI).

10. A system for facilitating access to graphics memory comprising:
 performance mode monitor for determining a performance mode of a graphics processing unit (GPU) of a graphics subsystem, wherein said GPU subsystem also comprises graphics memory;
 a memory available module for determining an amount of said graphics memory available for use by a general system application, wherein said GPU subsystem comprises said memory available module;
 an interpretation module for interpreting memory access requests; and
 a resource signaling module for signaling an operating system that said amount of said graphics memory is available for general system application.

11. The system of claim 10 wherein said graphics subsystem comprises graphics memory of multiple GPUs.

12. The system of claim 10 wherein said resource signaling module is operable to signal a chipset, wherein said chipset comprises a memory controller.

13. The system of claim 10 wherein said memory access requests are requests for data that was stored in virtual memory but is stored in said amount of said graphics memory available for use by a general system application.

14. The system of claim 10 wherein said memory access requests are received via a PCI Express bus.

15. The system of claim 10 wherein said memory available memory module is operable to predetermine said amount of said graphics memory available via a user configurable option.

16. A graphics processing unit (GPU) subsystem comprising:
 a graphics processor for executing graphics instructions;
 a frame buffer coupled to said graphics processor and comprising memory for storing data related to execution of said graphics instructions;
 a signaling module for signaling an operating system that a portion of said frame buffer is available for use by a computer system for general system use; and
 a frame buffer access module for facilitating access to said portion of said frame buffer memory by said computer system, wherein said portion of said frame buffer is operable to be accessed via a bus.

17. A GPU subsystem as described in claim 16 wherein said portion of said frame buffer memory is operable to handle a request to virtual memory.

18. A GPU subsystem as described in claim 16 wherein said signaling module is operable to signal a memory controller that said portion of said frame buffer is available and wherein further said bus is a PCI express bus.

19. A GPU subsystem as described in claim 16 wherein said data stored in said portion of said frame buffer is transferred to virtual memory upon said GPU entering a high performance graphics mode.

* * * * *